United States Patent [19]

Fuchs et al.

[11] 4,394,310
[45] Jul. 19, 1983

[54] 1-AMINO-2-SULFO-(4'-PYRAZOLONYL-PHENYL)-AMINOANTHRAQUINONE COMPOUNDS AND A PROCESS FOR THEIR PREPARATION

[75] Inventors: Hermann Fuchs, Königstein; Klaus Filzinger, Hofheim am Taunus, both of Fed. Rep. of Germany

[73] Assignee: Hoechst Aktiengesellschaft, Frankfurt am Main, Fed. Rep. of Germany

[21] Appl. No.: 202,779

[22] Filed: Oct. 31, 1980

Related U.S. Application Data

[63] Continuation of Ser. No. 75,534, Sep. 13, 1979, abandoned.

[30] Foreign Application Priority Data

Sep. 15, 1978 [DE] Fed. Rep. of Germany ....... 2840120

[51] Int. Cl.³ .................. C09B 62/45; C09B 62/503; C09B 62/505; D06P 1/384
[52] U.S. Cl. .................................. 260/162; 260/141; 260/153; 260/154; 260/157; 260/158; 260/163; 260/193
[58] Field of Search .............. 260/153, 154, 162, 163, 260/193, 196, 198, 199, 200, 205, 206, 207, 207.1, 176; 548/357, 367

[56] References Cited

U.S. PATENT DOCUMENTS

| | | | |
|---|---|---|---|
| 2,459,226 | 1/1949 | Kendall et al. | 548/567 X |
| 2,824,093 | 2/1958 | Benz et al. | 260/153 X |
| 2,938,024 | 5/1960 | Brassel et al. | 260/153 |
| 3,252,990 | 5/1966 | Green et al. | 548/367 |
| 3,717,624 | 2/1973 | Buehler et al. | 260/153 |

*Primary Examiner*—Floyd D. Higel
*Attorney, Agent, or Firm*—Curtis, Morris & Safford

[57] ABSTRACT

New water-soluble anthraquinone-azo compounds of the general formula

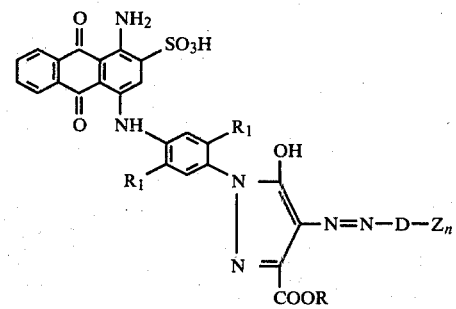

and their salts; in this formula the $R_1$s both are sulfo groups, or one of the two is a hydrogen atom and the other is a sulfo group, R is hydrogen or lower alkyl and D, as the radical of a diazo component, is the benzene or naphthalene nucleus, which is monosubstituted or di-substituted by a fiber-reactive group Z, corresponding to the index n being 1 or 2, and which furthermore can be substituted by 1 to 3 substituents selected from lower alkyl, lower alkoxy, halogen, nitro and sulfo. The new azo compounds are very suitable as dyestuffs for dyeing fiber materials containing hydroxy groups or carbonamide groups, such as natural or synthetic polyamide fibers or polyurethane fibers and cellulose fibers, yielding deep dyeing and prints with very good fastness properties to wet processing and very good fastness properties to light.

The new compounds of the above formula are obtained by diazotizing a 1-amino-2-sulfo-4-(4'-aminophenyl)-aminoanthraquinone compound, which is substituted by sulfo in the 2'- and/or 5'-position, by means of an equivalent amount of sodium nitrite in the presence of a mineral acid, coupling this diazonium salt with an acetyl-succinic acid ester of a lower alkanol, cyclizing this radical of the coupling component to the pyrazolone ring and coupling the pyrazolono-phenylamino-anthraquinone compound, thus obtained, with a diazonium compound of an amine of the formula

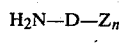

D, Z and n being defined as above. Up to the stage of the coupling reaction with the diazonium compound of the aforementioned amine, these reactions can be carried out as a "one-pot" reaction without intermediate isolation of intermediate products.

5 Claims, No Drawings

1-AMINO-2-SULFO-(4'-PYRAZOLONYL-PHENYL)-AMINOANTHRAQUINONE COMPOUNDS AND A PROCESS FOR THEIR PREPARATION

This is a continuation of application Ser. No. 075,534, filed Sept. 13, 1979, now abandoned.

Green color shades on natural or regenerated cellulose fibers or wool are often produced by dyeing with the aid of mixtures of blue and yellow dyestuffs. In this process it is possible to effect a desired shading by means of a third dyestuff belonging to the orange to red range, in accordance with the trichromatic principle which is used in industry. However, not all fiber-reactive dyestuffs are suitable for this combination mode of dyeing, but only selected products which have substantially the same uptake rate from the dye liquor onto the fiber and at the same time an identical rate of reaction between the fiber-reactive groups and the fiber. If these conditions do not coincide, separation of the individual dyestuffs takes place during the dyeing process, so that an uneven appearance or even multi-colored dyeings are obtained as a result of non-uniform dyeing in depth of the fiber material.

The present invention has made it possible to find new, water-soluble anthraquinone-azo compounds which reduce these difficulties of application. They have, written in the form of the free acid, the general formula (1)

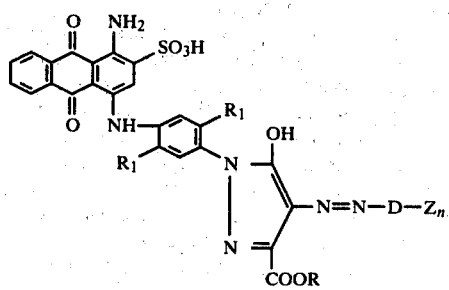

The new compounds can be in the form of the free acid or in the form of its salts. They are preferably in the form of their salts, particularly the alkali metal salts and the ammonium salt, but especially in the form of the sodium salts. The new compounds are suitable, preferably in the form of their alkali metal salts, for dyeing and printing fiber materials.

In the above formula (1) the various formula radicals have the following meaning: the $R_1$s are identical or different, but are not both hydrogen at the same time and each is a hydrogen atom or a sulfonic acid group; R is a hydrogen atom or a lower alkyl group, such as, in particular, the methyl group and the ethyl group; D is a phenyl or naphthyl radical which is substituted by the fiber-reactive group Z and can be substituted by 1 to 3 substituents belonging to the group comprising lower alkyl, such as, in particular, methyl and ethyl, lower alkoxy, such as, in particular, methoxy and ethoxy, halogen, such as, in particular, chlorine and bromine, nitro and sulfo; and n is the number 1 or 2, preferably 1.

Here, and in the following text, the term "lower" means that the alkyl or alkylene radicals contained in the groups can have 1 to 4 C atoms.

D is preferably a radical of the formula (2a) or (2b)

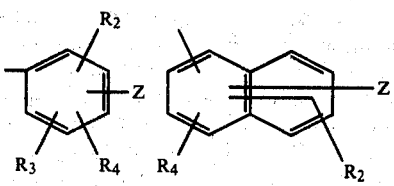

wherein the formula radicals $R_2$, $R_3$ and $R_4$ can be identical or different from one another, and $R_2$ is a hydrogen atom, a lower alkyl group, such as, in particular, a methyl or ethyl group, a lower alkoxy group, such as, in particular, a methoxy or ethoxy group, a chlorine or bromine atom or a sulfonic acid group, $R_3$ is a hydrogen atom, a lower alkyl group, such as, in particular, the methyl or ethyl group, a lower alkoxy group, such as, in particular, the methoxy or ethoxy group, or a chlorine or bromine atom, $R_4$ is a hydrogen atom, a lower alkyl group, such as, in particular, the methyl or ethyl group, a lower alkoxy group, such as, in particular, the methoxy or ethoxy group, or the sulfonic acid group and Z is a group of the formula (3a), (3b) or (3c)

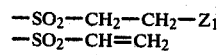

wherein $Z_1$ is a hydroxy group or an inorganic or organic radical which can be eliminated as known in a great number in the art, $R_5$ is a hydrogen atom or a lower alkyl group, such as, in particular, the methyl or ethyl group, which can additionally be substituted by a cyano group, and Y is a fiber-reactive radical belonging to the aliphatic, cycloaliphatic, aromatic and heterocyclic series.

Radicals $Z_1$ which can be eliminated under alkaline conditions and which belong to the formula (3a) are, for example, a halogen atom, such as a chlorine or bromine atom, the sulfato, thiosulfato or phosphato group or a lower alkylsulfonyloxy group, such as the methylsulfonyloxy or ethylsulfonyloxy group, or a lower dialkylamino group, such as, for example, the dimethylamino or diethylamino group. Radicals $Z_1$ which can be eliminated under neutral or acid conditions are, for example, the N-(β-sulfoethylamino) group or the N-(β-sulfoethyl)-N-methylamino group, which are preferably in the form of the sodium, potassium or ammonium salt.

The fiber-reactive radical Y is, in particular, a known fiber-reactive acyl radical of a lower halogenoalkanecarboxylic acid, a lower halogeno-alkene-monocarboxylic and halogeno-alkene-dicarboxylic acid, a nitrohalogenobenzenesulfonic or nitrohalogenobenzenecarboxylic acid, a halogenocyclobutylcarboxylic or halogenocyclobutenylcarboxylic acid or a halogenocyclobutylacrylic or halogenocyclobutenylacrylic acid or of a halogenoethylsulfonylendomethylenecyclohexanecarboxylic acid, a known fiber-reactive acyl radical of a benzo-heterocyclic carboxylic or sulfonic acid which is substituted by halogen in the heterocyclic structure, such as of a halogenobenzoxazolecarboxylic acid or of a halogenobenzthiazolecarboxylic or halogenobenzthiazolesulfonic acid, and also the fiber-reactive acyl radical of an aromatic-heterocyclic carboxylic acid or sulfonic acid, the heterocyclic structure of which preferably contains 2 or 3 nitrogen atoms and is preferably a 6-membered heterocyclic structure, for example the pyridazine, pyridazinone, pyrimidine, phthalazine, quinazoline or quinoxaline radical wherein the heterocyclic structure is substituted by one or two fiber-reactive leaving groups, preferably belonging to the group comprising halogen, such as chlorine and fluorine, lower alkylsulfonyl and sulfo, and can be substituted by 1, 2 or 3 further substituents, such as, for example, substituents belonging to the group comprising lower alkyl, lower alkoxy, lower carboalkoxy, lower halogenoalkyl, lower hydroxyalkyl, carboxy, sulfo, aryloxy, aliphatic mercapto, aromatic mercapto, lower alkanoyl, cyano, nitro and primary, secondary and tertiary amino groups having aliphatic, heterocyclic and/or aromatic radicals, and also the fiber-reactive radical of a heterocyclic structure having 2 or 3 nitrogen atoms, in particular a six-membered heterocyclic structure, for example the pyrimidine, pyridazine or triazine ring, wherein the heterocyclic structure is substituted by one or two fiber-reactive leaving groups, preferably belonging to the group comprising halogen, such as chlorine and fluorine, lower alkylsulfonyl and sulfo, and can be substituted by 1, 2 or 3 further substituents, such as, for example, substituents belonging to the group comprising lower alkyl, lower alkoxy, lower carboalkoxy, lower halogenoalkyl, lower hydroxyalkyl, carboxy, sulfo, aryloxy, aliphatic mercapto, aromatic mercapto, lower alkanoyl, cyano, nitro and primary, secondary and tertiary amino groups havng aliphatic, heterocyclic and/or aromatic radicals.

Y can also be a radical of the above formula (3a) in which $Z_1$ has the meaning indicated or can be the vinylsulfonyl group.

Examples of fiber-reactive radicals Y belonging to the formula (3c) are the chloroacetyl, bromoacetyl, β-chloropropionyl, β-bromopropionyl, α,β-dichloropropionyl or α,β-dibromopropionyl radical, the acyl radical of a chloromaleic acid, the β-sulfatoethylsulfonyl radical, the acryloyl radical, the β-chloroacryloyl and β-bromoacryloyl radicals, the α-chloroacryloyl and α-bromoacryloyl radicals, the α,β-dichloroacryloyl and α,β-dibromoacryloyl radicals, the trichloroacryloyl radical, the chlorocrotonyl, propiolyl, 3,5-dinitro-4-chlorobenzenesulfonyl or 3,5-dinitro-4-chlorobenzenecarbonyl radicals, the 2,2,3,3-tetraflurocyclobutylacryloyl, 2,2,3,3-tetrafluorocyclobutylcarbonyl, 2,3,3-trifluorocyclobut-1-enylacryloyl, 3-nitro-4-chlorobenzenesulfonyl or 3-nitro-4-chlorobenzenecarbonyl radical, the β-chloroethylsulfonylendomethylenecyclohexanecarbonyl radical and the 3-β-chloroethylsulfonylbenzoyl radical, and also the 2-chlorobenzoxazolecarbonyl, 2-chlorobenzthiazolecarbonyl or 2-chlorobenzthiazolesulfonyl radical, and also the six-membered heterocyclic acid radicals (acyl radicals) of β-(4,5-dichloropyridazin-6-on-1-yl)-propionic acid, 1,4-dichlorophthalazinecarboxylic or 1,4-dichlorophthalazinesulfonic acid, 2,4-dichloroquinazolinecarboxylic or 2,4-dichloroquinazolinesulfonic acid, 2,3-dichloroquinoxalinecarboxylic or 2,3-dichloroquinoxalinesulfonic acid, 2,6-bis-methylsulfonylpyridine-4-carboxylic acid, 3,6-dichloropyridazine-5-carboxylic acid, 2,4-dichloropyrimidine-6-carboxylic acid, 2,4-dichloropyrimidine-5-carboxylic acid, 2,6-dichloropyrimidine-4-carboxylic or 2,6-dichloropyrimidine-4-sulfonic acid, 2,6-dibromopyrimidine-4-carboxylic or 2,6-dibromopyrimidine-4-sulfonic acid, 2,6-dichloropyrimidine-5-carboxylic or 2,6-dichloropyrimidine-5-sulfonic acid, 2,6-dibromopyrimidine-5-carboxylic or 2,6-dibromopyrimidine-5-sulfonic acid, 2-chlorobenzthiazole-6-carboxylic acid and of a 2-chlorobenzthiazole-6-sulfonic acid, the β-sulfatoethylsulfonyl, β-chloroethylsulfonyl, β-phosphatoethylsulfonyl, β-thiosulfatoethylsulfonyl and vinylsulfonyl radicals, and also the des-halogen, des-sulfo or des-alkylsulfonyl radical, as relevant, of β-(4,5-dichloropyridazin-6-on-1-yl)-propionic acid, 1,4-dichlorophthalazinecarboxylic or 1,4-dichlorophthalazinesulfonic acid, 2,4-dichloroquinazolinecarboxylic or 2,4-dichloroquinzolinesulfonic acid or 2,3-dichloroquinoxalinecarboxylic or 2,3-dichloroquinoxalinesulfonic acid, or of 2-methylsulfonyl-4-chloro-6-methylpyrimidine, 2,4-bis-methylsulfonyl-6-methylpyrimidine, 2,4,6-tribromopyrimidine, 2,4,5,6-tetrabromopyrimidine, 2-methylsulfonyl-4,5-dichloro-6-methylpyrimidine, a 2,4-dichloropyrimidine-5-sulfonic acid, a 5-nitro-2,4,6-trichloropyrimidine or a 5-cyano-2,4,6-trichloropyrimidine, 2,6-bis-methylsulfonylpyridine-4-carboxylic acid, 2,4-dichloro-5-chloromethyl-6-methylpyrimidine, 2,4-dibromo-5-bromomethyl-6-methylpyrimidine, 2,4-dichloro-5-bromomethylpyrimidine, 2,4-dibromo-5-bromomethylpyrimidine, 2,5,6-trichloro-4-methylpyrimidine, 2,6-dichloro-4-trichloromethylpyrimidine, 2,4-bis-methylsulfonyl-5-chloro-6-methylpyrimidine, 2,4,6-trimethylsulfonyl-1,3,5-triazine, 2,4-dichloropyrimidine, 3,6-dichloropyrimidine, 3,6-dichloropyridazine-5-carboxylic acid, 2,6-dichloro-4-carboethoxypyrimidine, 2,6-dibromo-4-carboethoxypyrimidine, 2,4,5-trichloropyrimidine, 2,4-dichloropyrimidine-6-carboxylic acid, 2,4-dichloropyrimidine-5-carboxylic acid, 2,6-dichloropyrimidine-4-carboxylic or 2,6-dibromopyrimidine-4-carboxylic acid amide, 2,6-dichloropyrimidine-4-carboxylic or 2,6-dichloropyrimidine-4-sulfonic acid, 2,6-dibromopyrimidine-4-carboxylic or 2,6-dibromopyrimidine-4-sulfonic acid, 2,6-dichloropyrimidine-5-carboxylic acid amide, 2,6-dichloropyrimidine-5-sulfonamide, 2,6-dibromopyrimidine-5-carboxylic acid amide, 2,6-dibromopyrimidine-5-sulfonamide, 2,6-dichloropyrimidine-5-carboxylic or 2,6-dichloropyrimidine-5-sulfonic acid, 2,6-dibromopyrimidine-5-carboxylic or 2,6-dibromopyrimidine-5-sulfonic acid, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2,4,6-trichloro-5-bromopyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro-1,3,5-triazine, 2,4,6-tribromo-1,3,5-triazine, 2,4,6-trifluoro-1,3,5-triazine or of a 4,6-difluoro-1,3,5-triazine, 4,6-dibromo-1,3,5-triazine or 4,6-dichloro-1,3,5-triazine, it being possible for these dihalogenotriazines to be substituted additionally in the 2-position by a radical belonging to the group comprising aryl, such as phenyl, lower alkyl, such as methyl or ethyl, aliphatic mercapto, such as lower alkylmercapto, aromatic mercapto, such as arylthio, for example phenylthio, aliphatic oxy, such as lower alkoxy, aromatic oxy, such as aryloxy, for example phenoxy and naphthoxy, primary amino and secondary and tertiary amino having aliphatic, heterocyclic and/or aromatic radicals.

Such radicals, which are linked in the 2-position to the triazine nucleus of the 4,6-dihalogeno compound and can be prepared via the corresponding compounds, for example those cited below, by reaction with trihalogenotriazines, are, for example, the ether radicals of, for example, the following aliphatic and aromatic hydroxy compounds: lower thio alcohols, lower alkoxy alkanols, lower alkanols, such as methanol, ethanol and isopropanol, glycolic acid, phenol, chlorophenols and nitrophenols, phenolcarboxylic and phenolsulfonic acids, naphthols and naphtholsulfonic acids, and are, for example, the thioether radicals of, for example, aliphatic and aromatic mercapto compounds, such as thioglycolic acid and thiophenols. Amino groups which can be present in the 2-position of the triazine are, in particular, besides the primary amino group —NH₂, aliphatic and-/or aromatic amino groups which can contain an acylatable amino or hydroxy group, such as the amino radicals of hydroxylamine, hydrazine, sulfophenylhydrazine and the ethanolamines and propanolamines, and also the amino radicals of methylamine, ethylamine, isopropylamine, methoxyethylamine, methoxypropylamine, dimethylamine, diethylamine, methylphenylamine, ethylphenylamine, chloroethylamine, benzylamine, cyclohexylamine, morpholine, piperidine and piperazine and also, preferably, N,N-bis-β-(β'-chloroethylsulfonyl)-ethylamine, and equally oxygen ether compounds, which can also contain an acylatable amino group, such as hydroxylamine.

The new compounds of the formula (1) are prepared in a manner according to the invention by diazotizing, in a customary manner, a 1-amino-2-sulfo-4-(4'-aminophenyl)-aminoanthraquinone compound of the general formula (4)

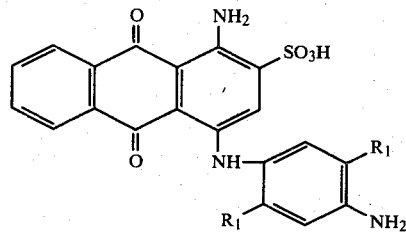
(4)

in which R₁ has the meaning cited above, selectively by means of an equivalent quantity of sodium nitrite, in the presence of a mineral acid, such as, for example, hydrochloric acid, to give the diazo compound of the general formula (5)

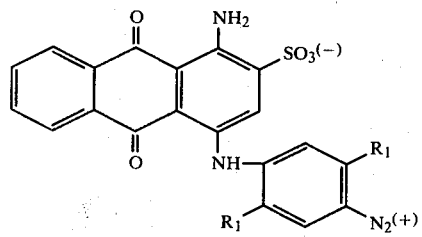
(5)

in which R₁ has the meaning cited, and subsequently coupling the diazonium salt of the cation of the formula (5), thus obtained, with an acetylsuccinic acid ester of a lower alkanol in the pH range from 3.5 to 5.5, preferably from 4.8 to 5.2, to give the compound of the formula (6)

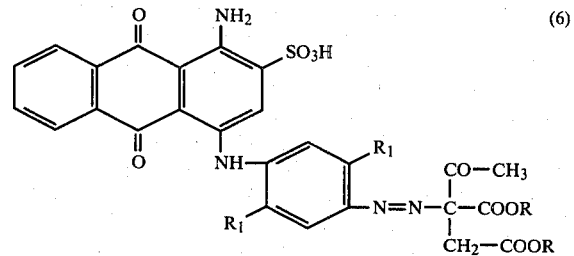
(6)

wherein R₁ has the meaning cited above and R is a lower alkyl radical, then adjusting the pH to a value within the range from 9 to 13.5, preferably from 11 to 13, and thus effecting the cyclization to give the pyrazolone compound of the general formula (7)

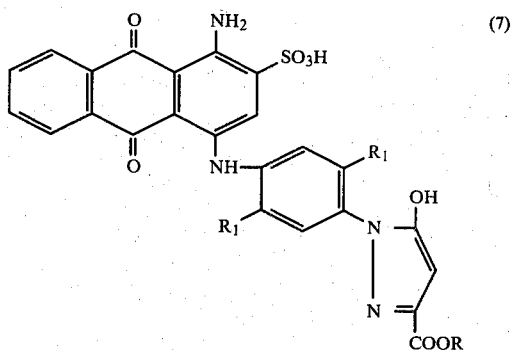
(7)

in which R and R₁ have the meaning cited above, and coupling this compound of the formula (7) with a diazonium compound of an amine of the general formula (8)

$$H_2N-D-Z_n \qquad (8)$$

in which D, Z and n have the meaning cited above.

The preparation according to the invention is preferably carried out as a "one-pot" reaction without intermediately isolating the intermediate stages (5), (6) and (7). It can, however, also be advantageous to isolate intermediately the intermediate substance (7) by salting out by means of sodium chloride and by filtration.

The cyclization to give the pyrazolone is carried out in the indicated pH range of from 9 to 13, at low temperatures, for example at temperatures between 0° and 40° C.; the reaction is preferably carried out at 15° to 30° C. Within this temperature range compounds of the formula (7) wherein R is the lower alkyl radical are obtained. Compounds of the general formula (7) in which R is hydrogen are obtained if the ester group is hydrolyzed at a pH value of 11 to 13 and at a temperature of 50° to 80° C., preferably at 60° to 65° C. In this process the hydrolysis can be carried out at the same time as the cyclization of the compound of the formula (6) to give compounds of the formula (7) or subsequently by converting the compound of the formula (7) which is formed and in which R is lower alkyl, into the compound of the formula (7) in which R is hydrogen.

Compounds of the general formula (1) having the fiber-reactive group of the formula (3a) wherein Z₁ is the sulfato or phosphato group, can also be prepared in a manner according to the invention by converting a compound of the formula (1) which has been obtained by the above procedure and which has the radical of the formula (3a) wherein $Z_1$ is the hydroxy group, into the corresponding ester, in accordance with procedures which are in themselves known, by means of sulfating or phosphating agents. Examples of sulfating agents are concentrated sulfuric acid, sulfuric acid containing sulfur trioxide (oleum), chlorosulfonic acid and aminosulfonic acid. Examples of phosphating agents are concentrated orthophosphoric acid, pyrophosphoric acid, polyphosphoric acid or mixtures of phosphoric acid and phosphorus pentoxide.

One modification of the above procedure according to the invention for the preparation of the compounds of the formula (1) wherein Z is the radical of the formula (3c), is to couple the compounds of the formula (7) with the diazo compound of a diamino compound of the formula (9)

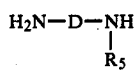  (9)

wherein D has the meaning indicated above, but is preferably a benzene nucleus which can contain the substituents cited above and $R_5$ has the meaning cited above (the amino group of the formula —$NHR_5$ being optionally substituted, but substituted of necessity, if D is a naphthalene nucleus, by a customary protective group, such as an acetyl group, which is subsequently removed again by hydrolysis), and subsequently to react the resulting compound of the formula (10)

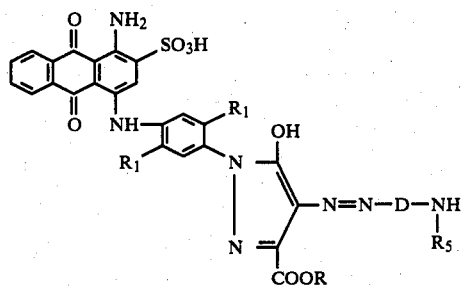  (10)

written in the form of the free acid, in which $R_1$, R, $R_5$ and D have the meaning cited, in the analogous manner to customary and known process methods, with a compound which contains the fiber-reactive radical and has the formula (11)

  (11)

wherein Y has the meaning cited above and Hal is a fluorine, chlorine or bromine atom, or with a corresponding acid anhydride containing the radical Y.

A further process variant, according to the invention, for the preparation of the compounds of the formula (1) in which R is hydrogen consists in carrying out the alkaline hydrolysis of the ester group in accordance with the conditions indicated above with the compounds of the above formula (10) in which R is lower alkyl, and reacting the resulting compound of the formula (10), in which R is hydrogen, in the manner indicated with the compound of the formula (11).

Examples of compounds of the formula (11) are chloroacetyl chloride, bromoacetyl chloride, β-chloropropionyl chloride, β-bromopropionyl chloride, α,β-dichloropropionyl chloride, α,β-dibromopropionyl chloride, chloromaleic anhydride, acryloyl chloride, β-chloroacryloyl chloride, β-bromoacryloyl chloride, α-chloroacryloyl chloride, α-bromoacryloyl chloride, α,β-dichloroacryloyl chloride, α,β-dibromoacryloyl chloride, trichloroacryloyl chloride, chlorocrotonyl chloride, propiolyl chloride, 3,5-dinitro-4-chlorobenzenesulfonyl chloride, 3,5-dinitro-4-chlorobenzenecarboxylic acid chloride, 2,2,3,3-tetrafluorocyclobutylacryloyl chloride, 3-nitro-4-chlorobenzenesulfonyl chloride, 3-nitro-4-chlorobenzenecarboxylic acid chloride, 2,2,3,3-tetrafluorocyclobutane-1-carboxylic acid chloride, α-chloroethylsulfonylendomethylenecyclohexanecarboxylic acid chloride, 3-α-chloroethylsulfonylbenzoyl chloride and heterocyclic acid halides and derivatives thereof, such as 2-chlorobenzoxazolecarboxylic acid chlorides, 2-chlorobenzthiazolecarboxylic acid chlorides and 2-chlorobenzthiazolesulfonyl chlorides, above all those which have at least two nitrogen atoms as the hetero-atoms of a 6-membered heterocyclic structure, such as, for example, β-(4,5-dichloropyridazin-6-on-1-ylpropionyl chloride, 1,4-dichlorophthalazinecarboxylic acid chloride, 1,4-dichlorophthalazinesulfonyl chloride, 2,4-dichloroquinazolinecarboxylic acid chloride, 2,4-dichloroquinazolinesulfonyl chloride, 2,3-dichloroquinoxalinecarboxylic acid chloride, 2,3-dichloroquinoxalinesulfonyl chloride, 2-methylsulfonyl-4-chloro-6-methylpyrimidine, 2,4-bis-methylsulfonyl-6-methylpyrimidine, 2,4,6-tribromopyrimidine, 2,4,5,6-tetrabromopyrimidine, 2-methylsulfonyl-4,5-dichloro-6-methylpyrimidine, 2,4-dichloropyrimidine-5-sulfonic acid, 5-nitro-2,4,6-trichloropyrimidine, 5-cyano-2,4,6-trichloropyrimidine, 2,6-bis-methylsulfonylpyridine-4-carboxylic acid chloride, 2,4-dichloro-5-chloromethyl-6-methylpyrimidine, 2,4-dibromo-5-bromomethyl-6-methylpyrimidine, 2,4-dichloro-5-bromomethylpyrimidine, 2,4-dibromo-5-bromomethylpyrimidine, 2,5,6-trichloro-4-methylpyrimidine, 2,6-dichloro-4-trichloromethylpyrimidine, 2,4-bis-methylsulfonyl-5-chloro-6-methylpyrimidine, 2,4,6-trimethylsulfonyl-1,3,5-triazine, 2,4-dichloropyrimidine, 3,6-dichloropyrimidine, 3,6-dichloropyridazine-5-carboxylic acid chloride, 2,6-dichloro-4-carboethoxypyrimidine, 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloropyrimidine-4-carboxylic acid amide, 2,6-dichloropyrimidine-5-carboxylic acid amide, 2,6-dibromopyrimidine-4-carboxylic acid amide, 2,6-dibromopyrimidine-5-carboxylic acid amide, 2,6-dichloropyrimidine-4-sulfonic acid amide or chloride, 2,6-dichloropyrimidine-5-sulfonic acid amide or chloride, 2,6-dibromopyrimidine-4-sulfonic acid amide or chloride, 2,6-dibromopyrimidine-5-sulfonic acid amide or chloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulfonyl chloride, 5-nitro-6-methyl-2,4-dibromopyrimidine, 2,4,6-trichloro-5-bromopyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro-, -tribromo- and -trifluoro-1,3,6-triazines and the 4,6-dichloro-, -dibromo- and -difluoro-1,3,5-triazines, which can be substituted in the 2-position by an aryl or lower alkyl radical, such as the phenyl, methyl or ethyl radical, or by an aliphatic or aromatic thioether or oxygen ether radical of the type cited earlier in the text or, in particular, by a primary amino group or an amino group which is substituted by aliphatic, heterocyclic and/or aromatic radicals.

The amino compounds which are used as the diazo components and which have the general formula (8) wherein Z is a fiber-reactive group of the above formula (3c) are known in large numbers from the literature and are prepared by procedures and process conditions described in the literature or by analogous procedures and process conditions, for example by reacting diamino compounds of the general formula (9) with a compound of the general formula (11) in which D, $R_5$, Y and Hal have the meaning cited initially, or with a corresponding acid anhydride containing the radical Y.

In the same way, the diazo components of the formula (8) wherein Z is a fiber-reactive group of the formula (3a) or (3b), are described in a large number of publications and patent specifications, from which their mode of preparation is also known.

The following are examples of aromatic amines of the general formula (9): 1,3-diaminobenzene, 1-amino-3-methylaminobenzene, 1-amino-3-ethylaminobenzene, 2,4-diaminotoluene, 2,4-diamino-1-ethylbenzene, 1,4-diaminobenzene, 1-amino-4-$\beta$-cyanoethylaminobenzene, 2-nitro-1,4-diaminobenzene, 1-amino-4-n-propylaminobenzene, 2-chloro-1,4-diaminobenzene, 1,3-diaminobenzene-4-sulfonic acid, 1,3-diaminobenzene-4,6-disulfonic acid, 1,4-diaminobenzene-5-sulfonic acid, 1,4-diaminobenzene-2,6-disulfonic acid, 1,4-diaminonaphthalene-6-sulfonic acid and 1,6-diaminonaphthalene-3,7-disulfonic acid.

The following are examples of aromatic amines of the formula (8) which contain a fiber-reactive group of the formula (3a) and which are used as diazo component for the preparation of the dyestuffs of the formula (1) according to the invention: 1-amino-4-$\beta$-sulfatoethylsulfonylbenzene, 1-amino-3-$\beta$-sulfatoethylsulfonylbenzene, 1-amino-4-$\beta$-sulfatoethylsulfonylbenzene-2-sulfonic acid, 1-amino-3-$\beta$-sulfatoethylsulfonylbenzene-6-sulfonic acid, 1-amino-3-$\beta$-sulfatoethylsulfonylbenzene-4,6-disulfonic acid, 2-amino-4-$\beta$-sulfatoethylsulfonylanisole, 2-amino-1,4-dimethoxy-5-$\beta$-sulfatoethylsulfonylbenzene, 2-amino-1-methoxy-4-methyl-5-$\beta$-sulfatoethylsulfonylbenzene, 1-amino-4-methoxy-3-$\beta$-sulfatoethylsulfonylbenzene, 2-bromo-1-amino-4-$\beta$-sulfatoethylsulfonylbenzene, 2,6-dichloro-1-amino-4-$\beta$-sulfatoethylsulfonylbenzene, 2-amino-6-$\beta$-sulfatoethylsulfonylnaphthalene-1-sulfonic acid, 2-amino-8-$\beta$-sulfatoethylsulfonylnaphthalene and 2-amino-8-$\beta$-sulfatoethylsulfonylnaphthalene-6-sulfonic acid and also derivatives thereof in which the $\beta$-sulfato leaving group is replaced, for example, by the phosphato group or the thiosulfato group, by a chlorine atom or by the acetoxy group, a lower alkylsulfonyloxy group or a dimethylamino or diethylamino group, and also $\beta$-hydroxyethylsulfonyl compounds thereof and derivatives thereof which are modified by other ester radicals, such as those having acyloxy radicals of alkylsulfonic acids or arylcarboxylic or arylsulfonic acids as the leaving groups.

The separation of the compounds, prepared in accordance with the invention, from the reaction mixture is effected by generally known methods, either by precipitation from the reaction medium by means of electrolytes, such as, for example, sodium chloride or potassium chloride, or by evaporating the reaction solution, for example by spray-drying. If the last-mentioned method of isolating the dyestuff is selected, it is frequently advisable to eliminate any quantities of sulfate which may be present in the solutions, before evaporation, by precipitation as gypsum and removal by filtration. In some cases, it can also be desirable, optionally after adding buffer substances, to use the dyestuff solution directly for tinctorial purposes, in the form of a liquid preparation.

The new compounds of the formula (1) have proved to be compounds with very good dyestuff properties; as water-soluble dyestuffs, they are, in particular, excellently suitable for dyeing and printing fibers, containing carboxamide groups, of both natural and synthetic origin, such as silk, wool and other animal hairs, polyamide fibers and polyurethane fibers. They are suitable with particular advantage for dyeing wool.

For dyeing and printing the abovementioned fiber materials, the dyestuffs are applied to the fiber material and are fixed thereon by the dyeing and printing methods which are known and customary in the art. Thus, for example, for dyeing wool and polyamide fibers, the new dyestuffs are applied to these fibers from a neutral or preferably slightly acid aqueous dyebath with a constant or virtually constant pH value. In this procedure it is preferable to carry out dyeing at between 40° and 120° C. in the presence of compounds which are customary in dyebaths and dye liquors for such fiber materials, such as, for example, sodium sulfate, ammonium acetate and surface-active compounds, such as quaternary ammonium salts and nonionic wetting agents and dispersing agents. It can be advantageous for the evenness of the resulting dyeings to add $\beta$-N-methylaminoethanesulfonic acid, in the form of its sodium salt. It is also possible to alter the pH value of the dyebath during the dyeing process by adding acids or acid salts or, correspondingly, alkalis or alkaline salts, for example by beginning the dyeing process at a pH of 4.5 and increasing this value to 7.5 during the dyeing process.

In addition to dyeing fiber materials containing carboxamide groups, the new dyestuffs, apart from those wherein $Z_1$ is the N-($\beta$-sulfoethylamino) or N-($\beta$-sulfoethyl)-N-methylamino group, are also very suitable for dyeing and printing fiber materials containing hydroxy groups, especially natural and regenerated cellulose fibers, such as cotton, linen or viscose rayon. Since they possess fiber-reactive properties, they are advantageously applied to these fiber materials by dyeing and printing processes which are customary and known for fiber-reactive dyestuffs and are fixed at room temperature or an elevated temperature, for example at temperatures between 20° and 180° C., in a customary manner with the aid of an acid-binding agent, such as sodium hydroxide, potassium hydroxide, sodium carbonate, potassium carbonate, disodium phosphate, sodium bicarbonate or waterglass, which can be applied to the fiber materials before, during or after the application of the dyestuffs.

Thus the present invention also relates to processes for dyeing and printing fiber materials containing hydroxy groups and synthetic and natural fiber materials containing carboxamide groups, particularly those of the type cited above, by customary and known procedures, using a compound corresponding to the general formula (1) as the dyestuff.

On the fiber materials cited, the new compounds of the general formula (1) produce green to olive-green dyeings and prints which were previously only obtainable by means of mixtures of yellow and blue dyestuffs. Compared with these conventional green formulations obtained from yellow and blue dyestuffs, the compounds corresponding to the formula (1) which are used as dyestuffs are therefore distinguished by the particular advantage that they are simpler to employ.

The technical process of dyeing is simplified in an advantageous manner; it is no longer necessary, as in the case of the conventional green formulations, to match the dyestuffs in respect of their reaction rate with the fiber and in respect of their differing affinities. If the new dyestuffs of the formula (1) are employed, in a given case, in the dyeing process with the addition of a second shading dyestuff and dyeing in a dual combination is thus necessary, compared with the earlier triple combination there is still a considerably lower outlay in terms of application technology.

Furthermore, compared with green formulations hitherto customary, the new dyestuffs possess the advantage of producing dyeings in a higher dyeing yield; they are thus cheaper to use.

The dyeings and prints obtained with the new dyestuffs possess very good fastness to wet processing and also very good fastness to light. Fastness properties which should be singled out particularly are the very good fastness to washing at various high temperatures of the washing baths, the very good fastness to acid and alkaline perspiration, the fastness to decatizing and milling, the fastness to peroxide bleaching and the fastness to acid cross-dyeing.

The examples which follow serve to illustrate the invention. The parts are parts by weight and the percentages relate to percentages by weight unless there is a note to the contrary. The relationship of parts by weight to parts by volume is that of the kilogram to the liter.

EXAMPLE 1

49 parts of 1-amino-4-(2'-sulfo-4'-aminophenyl)-aminoanthraquinone-2-sulfonic acid are dissolved to give a neutral solution in 500 parts of water by adding 24.2 parts of 33% strength aqueous sodium hydroxide solution. 400 parts of ice, followed by 60 parts of 31% strength aqueous hydrochloric acid, are then added and 17.3 parts of a 40% strength aqueous solution of sodium nitrite are then added dropwise in the course of 10 minutes. The mixture is stirred for a further 30 minutes. 18.8 parts of acetylsuccinic acid dimethyl ester are added to the diazonium salt of the anthraquinone compound thus prepared; the pH of the reaction mixture is adjusted to a value of 5.0 to 5.5 by sprinkling in sodium bicarbonate and the mixture is kept at this pH range for 3 to 6 hours. The pH is then adjusted to a value of 11.0 to 12.5 by means of 17.1 parts of 33% strength aqueous sodium hydroxide solution, and is maintained for one hour, after which the pH of the solution is readjusted to 6.0 to 6.5 by adding 22.9 parts of 31% strength hydrochloric acid.

The anthraquinone-pyrazolone compound thus obtained is salted out by adding 136 parts of sodium chloride and is filtered off. It is dissolved in 270 parts of water and coupled in this solution with a diazonium salt solution prepared in the following manner: 28.1 parts of 1-amino-4-β-sulfatoethylsulfonylbenzene are dissolved in 130 parts of water at a pH value of 6.0 to 6.5 by adding 7.2 parts of sodium carbonate. 94 parts of ice are introduced and 21.4 parts of 31% strength hydrochloric acid are then added. 17.3 parts of a 40% strength aqueous solution of sodium nitrite are then added dropwise in the course of 15 minutes. The diazotization is complete after stirring for a further period of 30 minutes. A slight excess of nitrite is destroyed by adding 0.1 part of aminosulfonic acid. This diazonium salt suspension is added to the solution of the anthraquinone-pyrazolone compound in the course of 15 to 30 minutes. At the same time, the pH is maintained at a value of about 6.5 by sprinkling-in 3.8 parts of sodium carbonate. The coupling is complete after stirring for a further period of 1 to 2 hours. The resulting compound corresponding to the general formula (1) is isolated by evaporation or spray-drying. It has the formula

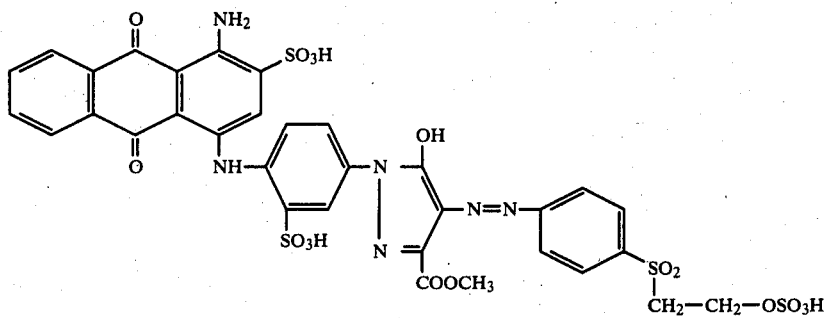

written in the form of the free acid, and dyes wool, from a dyebath containing a little acetic acid and heated to 95° C., in a strong green which has very good fastness to wet processing and very good fastness to light. The dyeings obtained on cotton or rayon, using customary dyeing and printing processes, have very good fastness to wet processing and very good fastness to light.

EXAMPLE 2

If, in Example 1, the 1-amino-4-β-sulfatoethylsulfonylbenzene is replaced by the same quantity of 1-amino-3-β-sulfatoethylsulfonylbenzene, carrying out the test under otherwise identical conditions, a compound which has the formula

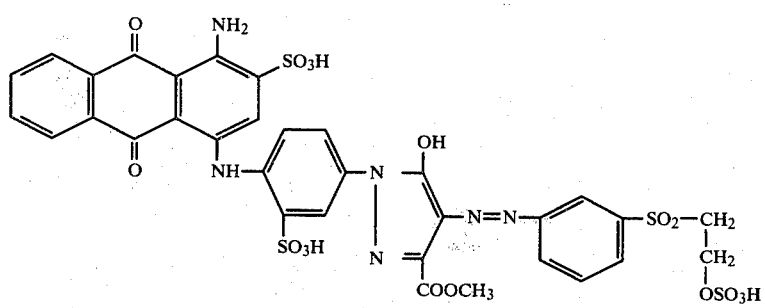

written in the form of the free acid, and which has similar good tinctorial and fastness properties, is obtained.

USE EXAMPLE 1

100 parts of a woollen fabric are introduced into an aqueous dyebath, warmed to 40° C., which contains 2.0 parts of the dyestuff of Example 2, 0.15 part of a product from the addition reaction of 12 moles of ethylene oxide with 1 mole of stearylamine, 2 parts of ammonium acetate and 2 parts of 60% strength aqueous acetic acid in 3,000 parts of water. The temperature of the dyebath is raised to the boil in the course of 30 minutes and dyeing is then continued for a further 60 minutes at 100° C. After finishing in the customary manner, a green dyeing which has good evenness, good to very good fastness to wet processing and excellent fastness to light is obtained.

EXAMPLE 3

57.0 parts of 1-amino-(2',5'-disulfo-4-aminophenyl)-aminoanthraquinone 2 sulfonic acid are dissolved in 500 parts of water at a pH of 6.5 to 7.5 by means of 36.3 parts of 33% strength aqueous sodium hydroxide solution. 400 parts of ice, followed by 60 parts of 31% strength hydrochloric acid, are added; the anthraquinone compound is diazotized by adding 17.3 parts of a 40% strength aqueous solution of sodium nitrite dropwise in the course of 10 minutes. After stirring for a further period of 30 minutes, 18.8 parts of acetylsuccinic acid dimethyl ester are added as the coupling component and the pH of the reaction mixture is adjusted to a value of 5.0 to 5.5 by sprinkling in sodium bicarbonate; this pH is maintained for 3 to 6 hours. The coupling is complete when the pH remains constant for a period of one hour without adding sodium bicarbonate. 17.1 parts of 33% strength aqueous sodium hydroxide solution are then added thereby adjusting the pH of the solution to a value of 11.0 to 12.5 and maintaining this value; thereafter the pH is readjusted to a value of 6.0 to 6.5 by means of 22.9 parts of 31% strength hydrochloric acid. The pyrazolone compound which is obtained by cyclization is employed direct, in the form of this solution, for the coupling reaction described in the following text.

A diazonium salt solution which is prepared in the following manner is used for this reaction: 31.1 parts of 2-amino-4-β-sulfatoethylsulfonylanisole are dissolved in 130 parts of water at a pH of 6.0 to 6.5 by adding 7.2 parts of sodium carbonate. 17.5 parts of a 40% strength aqueous solution of sodium nitrite are added and the solution thus obtained is added dropwise to a well-stirred mixture of 150 parts of ice and 21.4 parts of 31% strength hydrochloric acid. The diazotization is complete after stirring for a further period of 30 minutes. A slight excess of nitrite is destroyed by adding 0.2 part of amidosulfonic acid.

The diazonium salt solution is now added dropwise to the solution of the anthraquinone-pyrazolone prepared initially, the pH being adjusted, at the same time, to a value of 6.0 to 6.5 by sprinkling-in 3.8 parts of sodium carbonate. The coupling is complete after stirring for a further period of 1 to 3 hours.

The compound, which is isolated by salting out with sodium chloride or potassium chloride has the formula written in the form of the free acid. It dyes wool, for example by the procedure indicated in Use Example 1 above, in olive-green shades which have good evenness, good to very good fastness to wet processing and excellent fastness to light.

EXAMPLE 4

If, in Example 3, the 2-amino-4-β-sulfatoethylsulfonylanisole is replaced by 36.1 parts of 1-amino-4-β-sulfatoethylsulfonylbenzene-2-sulfonic acid, an otherwise identical procedure gives a compound of the formula below (written in the form of the free acid)

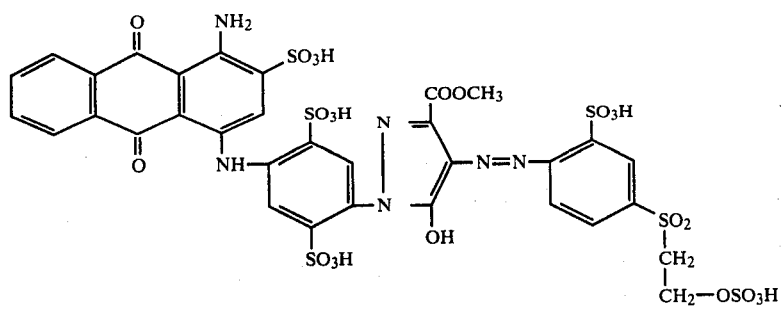

It dyes wool, for example in accordance with the dyeing conditions indicated in Use Example 1, in green shades which have good evenness, good to very good fastness to wet processing and excellent fastness to light.

EXAMPLE 5

If, in Preparation Example 1, the 1-amino-4-β-sulfato-ethylsulfonylbenzene is replaced by 33.6 parts of 1-amino-3-(dichloro-s-triazinylamino)-benzene-6-sulfonic acid, but the mode of preparation followed is analogous to that described in the Example, a dark green powder of the compound of the formula (written in the form of the free acid)

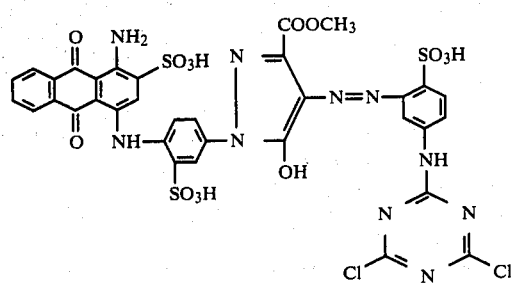

is obtained after salting out with sodium chloride and drying the compound which has been precipitated and filtered off; this powder produces dyeings on cotton, using customary dyeing and printing processes, which have very good fastness to wet processing and good fastness to light.

EXAMPLES 6 TO 34

If the procedure followed is analogous to that described in one of the above Examples, but the corresponding 1-amino-4-(4'-aminosulfophenyl)-aminoanthraquinone-2-sulfonic acid, acetylsuccinic acid ester and diazo component containing the fiber-reactive radical are employed as the starting compounds, the compounds according to the general formula (1), listed in the table which follows are obtained; these also have good dyestuff properties in tinctorial respects and in regard to their fastness properties, and dye cotton or wool in the color shades indicated in the table.

| Example | Compound according to formula (1) | Color shade |
|---|---|---|
| 6 | ![structure] | green |
| 7 | ![structure] | grey-green |

-continued

| Example | Compound according to formula (1) | Color shade |
|---|---|---|
| 8 | (structure) | grey-green |
| 9 | (structure) | blue-green |
| 10 | (structure) | grey-green |
| 11 | (structure) | green |
| 12 | (structure) | olive-green |

-continued
| Example | Compound according to formula (1) | Color shade |
|---|---|---|
| 13 | 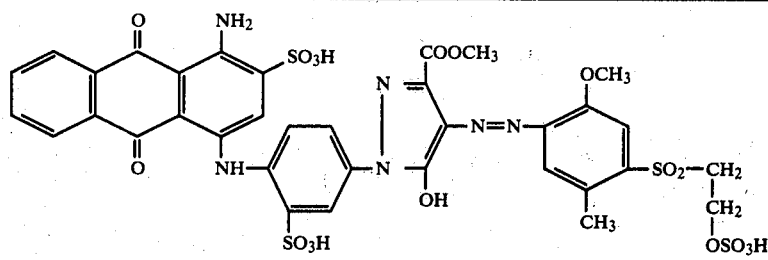 | green |
| 14 | 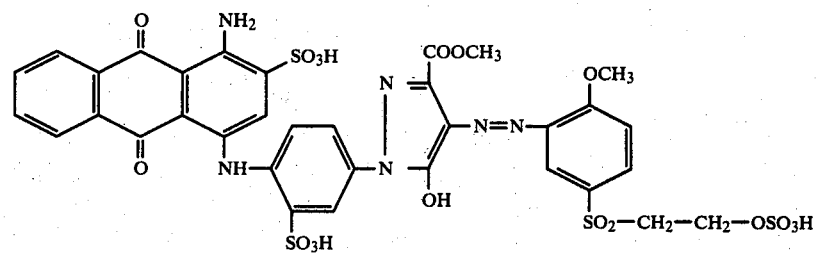 | green |
| 15 | 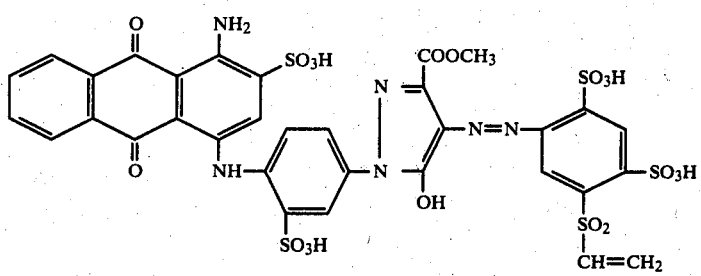 | blue-green |
| 16 | 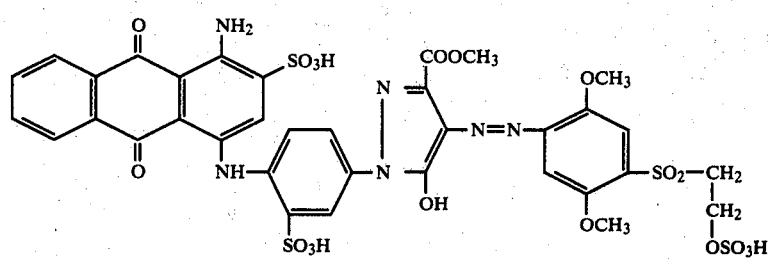 | olive-green |
| 17 | 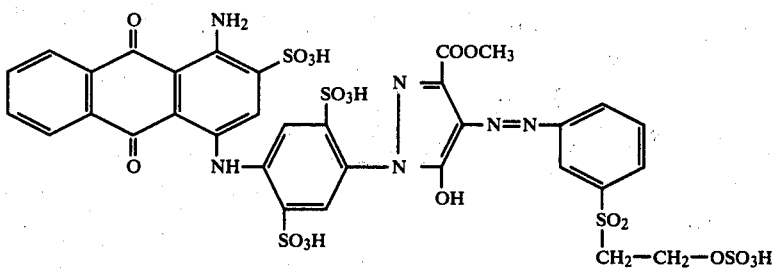 | olive-green |
| 18 | 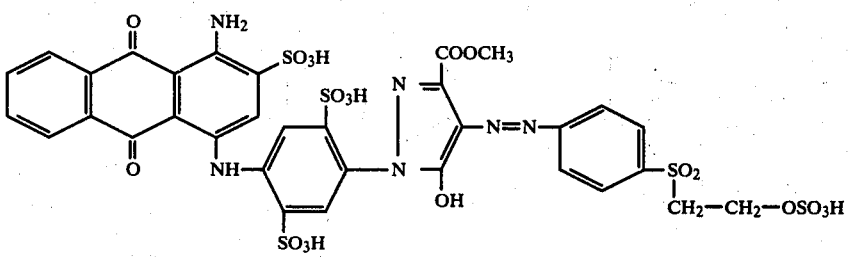 | olive-green |

-continued

| Example | Compound according to formula (1) | Color shade |
|---|---|---|
| 19 | | olive-green |
| 20 | | olive-green |
| 21 | | olive-green |
| 22 | | green |
| 23 | | green |

| Example | Compound according to formula (1) | Color shade |
|---|---|---|
| 24 | 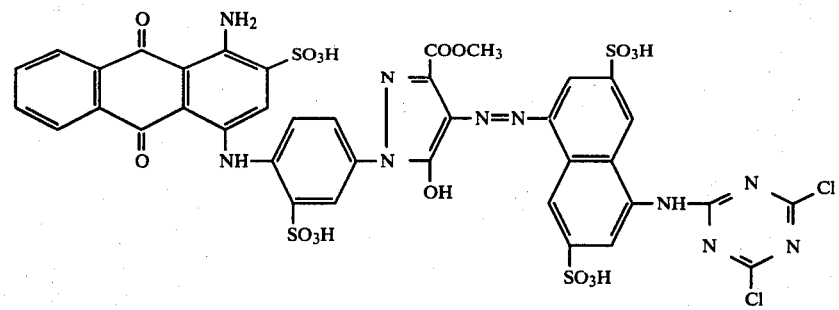 | olive-green |
| 25 | 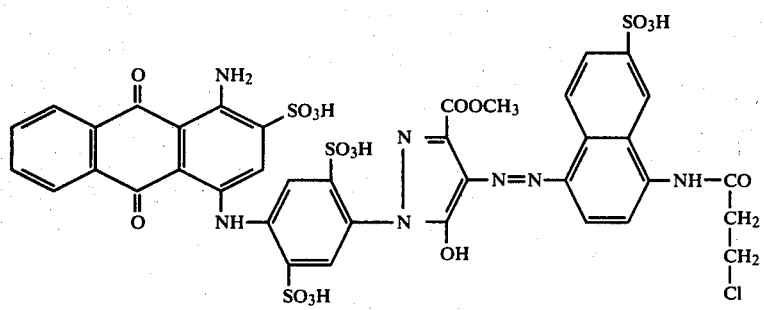 | olive-green |
| 26 | 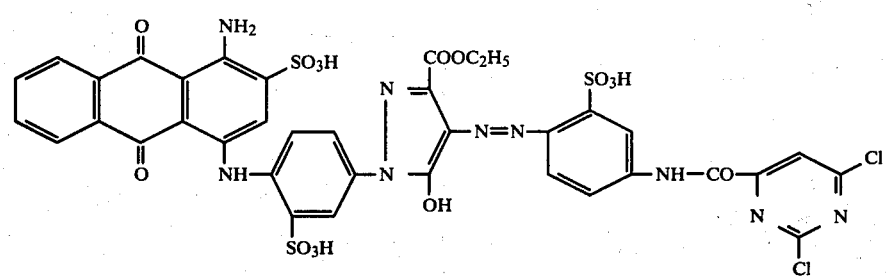 | olive-green |
| 27 | 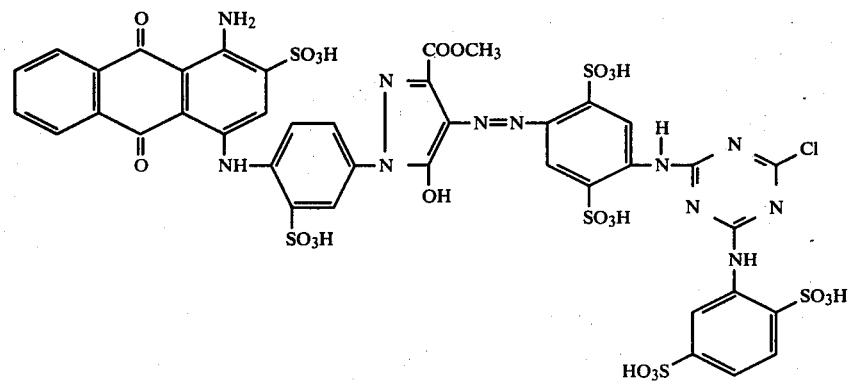 | olive-green |
| 28 | 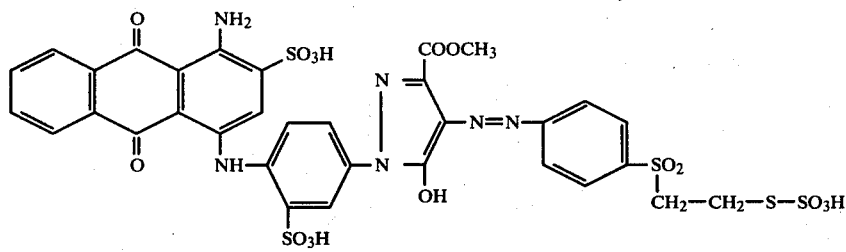 | green |

-continued

| Example | Compound according to formula (1) | Color shade |
|---|---|---|
| 29 | | green |
| 30 | | green |
| 31 | | olive-green |
| 32 | | green |
| 33 | | olive-green |

| Example | Compound according to formula (1) | Color shade |
|---|---|---|
| 34 | 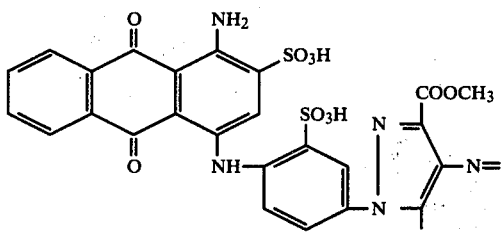 | olive-green |

EXAMPLE 35

The anthraquinone-pyrazolone compound obtained in accordance with Example 1 is dissolved in water, as described in that Example, and is coupled with a diazonium salt solution prepared in the following manner: 26.8 parts of 1,4-diaminobenzene-2,5-disulfonic acid are dissolved in 150 parts of water under neutral conditions, at a pH value of 6.5 to 6.8, by adding sodium carbonate; 17.3 parts of a 40% strength aqueous solution of sodium nitrite are added to the solution and the mixture is then run into a mixture of 35 parts of 31% strength hydrochloric acid and 100 parts of ice. After 15 minutes, a slight excess of nitrite is decomposed with 0.8 part of amidosulfonic acid.

The solution of the anthraquinone-pyrazolone compound is added to this diazonium salt solution and the pH of the mixture is adjusted to a value of 6.0 with sodium carbonate. After the coupling is complete, an aqueous solution of 35.5 parts of 1-(dichloro-s-triazinyl)-aminobenzene-4-sulfonic acid in 300 parts of water is added at the same pH value. The pH value is maintained at 6.5 with sodium carbonate. The acylation is complete after a reaction time of 2 to 3 hours. The resulting compound, corresponding to the general formula (1), is isolated by evaporation or spray-drying. It has the following structure

EXAMPLE 36

49 parts of 1-amino-4-(2'-sulfo-4'-aminophenyl)-aminoanthraquinone-2-sulfonic acid are dissolved in 500 parts of water to a neutral solution by adding 24.2 parts of 33% strength aqueous sodium hydroxide solution. 400 parts of ice, followed by 60 parts of 31% strength hydrochloric acid, are then added and 17.3 parts of a 40% strength aqueous solution of sodium nitrite are then added dropwise in the course of 10 minutes, while stirring. After 30 minutes 18.8 parts of acetylsuccinic acid dimethyl ester are added to the diazonium salt suspension of the anthraquinone compound and the pH of the reaction mixture is adjusted to 5.0 to 5.5 by sprinkling in sodium bicarbonate. This pH value is maintained until the end of the reaction (after about 3 to 6 hours); the pH is then adjusted to a value of 12.0 to 12.5 by means of 17.1 parts of 33% strength aqueous sodium hydroxide solution and the solution is heated for 2 hours at 60° C. in order to hydrolyze the methyl ester group in the pyrazolone radical formed. The pH of the solution is then re-adjusted to a value of 6.0 to 6.5 with 22.9 parts of 33% strength aqueous hydrochloric acid. The compound of the formula (written in the form of the free acid)

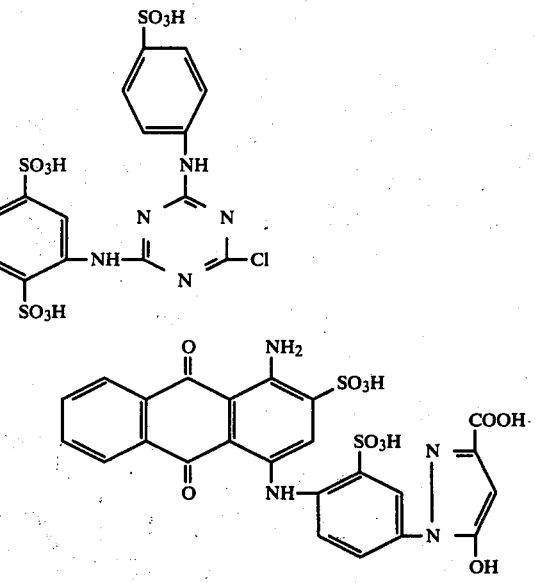

written in the form of the free acid, and dyes cotton or staple rayon by customary dyeing or printing processes in olive-green shades which have very good fastness to wet processing and good fastness to light.

Compounds according to formula (1) which have a corresponding structure and are indicated in the preceding Examples are prepared in an analogous manner by coupling the anthraquinone-pyrazolone compound with the diazo component of the corresponding diaminoaryl compound and by subsequently acylating the second amino group in the anthraquinone-pyrazolone-azoaryl compound thus obtained.

which is thus obtained is salted out by means of sodium chloride and is filtered off. The filter residue is dissolved in 300 parts of water and is coupled with a diazonium salt suspension prepared in the following manner: 44.8 parts of 3-[N-(4'-N'-methyl-N'-β-chloroethylsulfonylamino)-benzoyl]-aminoaniline-6-sulfonic acid are dissolved, at a pH value of 6.5, in 250 parts of water by warming to 50° C. 17.3 parts of a 40% strength aqueous solution of sodium nitrite are added to this solution and the mixture is then run into a mixture of 35 parts of 31% strength aqueous hydrochloric acid and 150 parts of ice. After stirring for a period of 2 hours, residues of nitrous acid are decomposed with a little amidosulfonic acid and the aqueous solution is added to the anthraquinone-pyrazolone compound prepared above. The pH of the coupling mixture is adjusted to a value of 6.5 with sodium carbonate and this value is maintained until the end of the coupling reaction. The compound according to formula (1) thus prepared is isolated by salting out with sodium chloride or potassium chloride or by spray-drying. It has the formula

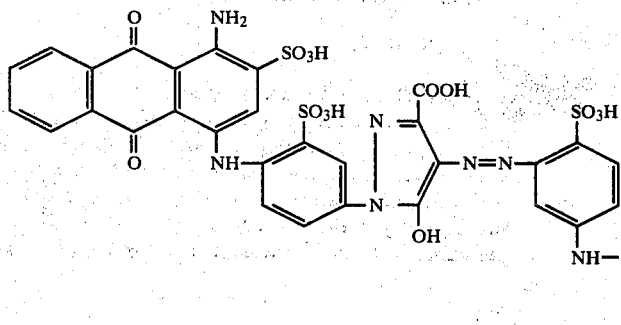

written in the form of the free acid, and dyes wool, for example by the procedure indicated in Use Example 1, in green shades which have good evenness, very good fastness to wet processing and good fastness to light.

The carboxylic acid ester compounds according to the invention which have been mentioned in the preceding Examples can be prepared, in a manner analogous to that described in this Example, in the form of their carboxylic acid compounds (that is to say R in formula (1) is a hydrogen atom), if, after preparing the anthraquinone-pyrazolone compound, the ester group of the latter is saponified in an appropriate manner to give the carboxylic acid group, before the subsequent coupling reaction. The carboxylic acid compounds according to formula (1) thus obtained have tinctorial properties and fastness properties which are equally as good as those of their alkyl ester compounds.

What is claimed is:

1. A water-soluble anthraquinone-azo compound in the form of a free acid having the formula

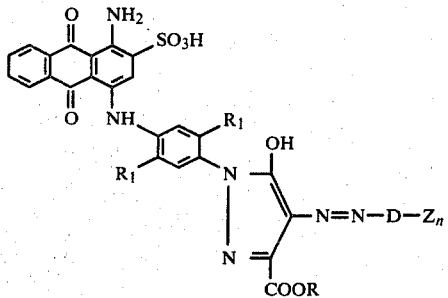

wherein each $R_1$ is sulfo or when one $R_1$ is hydrogen the other $R_1$ is sulfo; R is hydrogen or lower alkyl; D is unsubstituted benzene or unsubstituted naphthalene or benzene or naphthalene which is substituted by 1 to 3 substituents selected from the group consisting of lower alkyl, lower alkoxy, halogen, nitro and sulfo and is substituted by the a fibre-reactive group Z which is the group $-SO_2-CH_2-CH_2-Z_1$ or $-SO_2-CH=CH_2$, in which $Z_1$ is hydroxy or an inorganic or organic radical which can be eliminated to form $-SO_2-CH=CH_2$ and n is 1 or 2.

2. A compound according to claim 1, wherein n is 1.

3. A compound according to claim 1, wherein n is 1 and D substituted by the fiber-reactive group Z, is the group

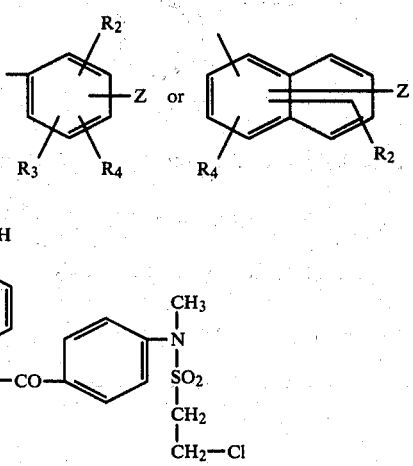

in which $R_2$, $R_3$ and $R_4$ are identical or different from one another and $R_2$ is hydrogen, lower alkyl, lower alkoxy, chlorine, bromine or sulfo, $R_3$ is hydrogen, lower alkyl, lower alkoxy, chlorine or bromine, $R_4$ is hydrogen, lower alkyl, lower alkoxy or sulfo and Z is a group of the formula

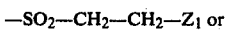
$-SO_2-CH_2-CH_2-Z_1$ or

$-SO_2-CH=CH_2$ in which $Z_1$ is a group as defined in claim 1.

4. A process for the preparation of a compound defined in claim 1, which comprises diazotizing a compound of the formula

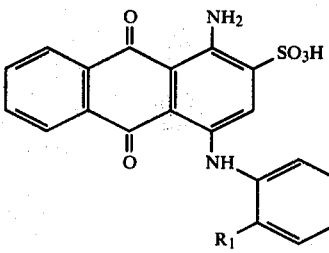

in which $R_1$ is defined as in claim 1, by means of an equivalent quantity of sodium nitrite, in the presence of a mineral acid, to give the diazo compound of the formula

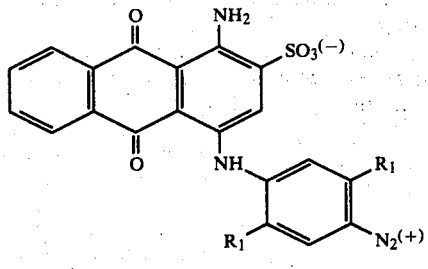

in which $R_1$ is defined as in claim 1, and coupling the diazonium salt at a pH in the range of from 3.5 to 5.5 with an acetylsuccinic acid ester of a lower alkanol, adjusting then the pH to a value within the range from 9 to 13 to form the pyrazolone compound of the formula

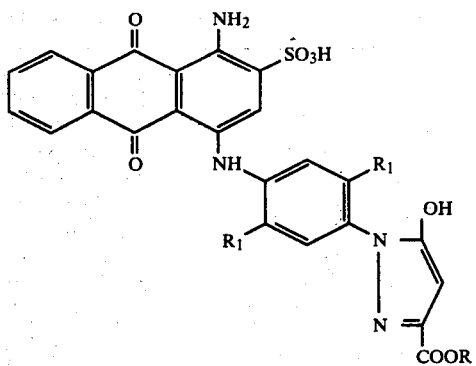

in which R and $R_1$ are defined as in claim 1, and coupling this compound with the diazonium compound of an amine of the formula

in which D, Z and n are defined as in claim 1.

5. A process according to claim 4 for the preparation of a compound according to claim 1 but R being hydrogen, which comprises saponifying the ester group —COOR, in which R is lower alkyl, simultaneously or subsequently to the pyrazolone cyclization reaction at a pH value of 11 to 13 and at a temperature of 50° to 80° C.

* * * * *